(12) United States Patent
Kadah

(10) Patent No.: US 8,261,445 B2
(45) Date of Patent: Sep. 11, 2012

(54) ALUMINUM TUBE-ALUMINUM FIN BASEBOARD RADIATOR

(75) Inventor: Hassan B. Kadah, Hortonville, WI (US)

(73) Assignee: International Controls and Measurements Corp., North Syracuse, NY (US)

( * ) Notice: Subject to any disclaimer, the term of this patent is extended or adjusted under 35 U.S.C. 154(b) by 416 days.

(21) Appl. No.: 12/623,735

(22) Filed: Nov. 23, 2009

(65) Prior Publication Data

US 2011/0120688 A1    May 26, 2011

(51) Int. Cl.
*B21D 39/06* (2006.01)
(52) U.S. Cl. ........... 29/890.038; 29/890.03; 29/890.039; 29/890.04; 165/148; 165/176
(58) Field of Classification Search ............... 29/890.03, 29/890.038, 890.039, 890.04; 165/148, 176
See application file for complete search history.

(56) References Cited

U.S. PATENT DOCUMENTS

| | | | | |
|---|---|---|---|---|
| 2,023,738 A * | 12/1935 | Mason et al. | ............ | 29/727 |
| 2,426,107 A | 8/1947 | Kramer | | |
| 3,490,524 A * | 1/1970 | Pasternak | ............ | 165/182 |
| 4,277,021 A | 7/1981 | Daye | | |
| 4,284,129 A | 8/1981 | Rogalski | | |
| 4,598,938 A | 7/1986 | Boss et al. | | |
| 4,603,890 A * | 8/1986 | Huppee | ............ | 285/239 |
| 4,707,905 A * | 11/1987 | Clair | ............ | 29/446 |
| 4,730,234 A * | 3/1988 | Monico, Jr. | ............ | 361/695 |
| 5,419,042 A * | 5/1995 | Kado | ............ | 29/890.052 |
| 6,834,710 B2 | 12/2004 | Weintraub et al. | | |
| 7,438,121 B2 | 10/2008 | Minami et al. | | |
| 7,485,374 B2 | 2/2009 | Suzuki et al. | | |
| 2007/0152442 A1 | 7/2007 | Cleveland et al. | | |
| 2008/0223947 A1 | 9/2008 | Liu | | |

FOREIGN PATENT DOCUMENTS

| | | |
|---|---|---|
| FR | 0488077 | 8/1918 |
| WO | WO82/03901 A1 | 11/1982 |
| WO | WO2004/053414 A1 | 6/2004 |
| WO | WO2007/000444 A2 | 1/2007 |
| WO | WO2007/082921 A1 | 7/2007 |

* cited by examiner

*Primary Examiner* — Richard Chang
(74) *Attorney, Agent, or Firm* — Bernhard P. Molldrem, Jr.

(57) ABSTRACT

A baseboard radiator element is formed of an aluminum tube and fins or vanes of aluminum sheet. An elongated strip of sheet aluminum is bent into a fin assembly of generally rectangular fins alternating with spacer members, with the fins having central apertures. The fin assembly is placed into a fixture and the tube is forced through the aligned apertures to create strong mechanical and thermal contact between tube and fins. The fin structure can be used with center tubes of other materials. A brass or steel connector insert is fitted into the end of the aluminum tube, and the end of the tube is deformed inward using a collet or jaw device to create a hermetic seal with the tube. The process can also be used for joining aluminum tubing to tubing of aluminum or other materials.

12 Claims, 3 Drawing Sheets

ALUMINUM TUBE-ALUMINUM FIN BASEBOARD RADIATOR

BACKGROUND OF THE INVENTION

The present invention relates to residential heating systems and other indoor comfort systems, and is more particularly concerned with improvements to baseboard radiator heating systems. The invention is more specifically concerned with an improved baseboard radiator of the tube and fin type.

Baseboard room heating systems are commonly employed in homes and commercial spaces because of their simplicity of construction and operation. In a typical hot water heated system, water circulates from a furnace or boiler through a zone loop which may have one or more baseboard radiators. The flow is in series through the radiators and then the water is returned to the furnace or boiler. Baseboard hot water heating is perhaps the simplest method of heating that can be installed in a comfort space.

In the typical baseboard heater or radiator (sometimes called a convector) that is in common use, there is a copper tube or pipe, through which the hot water flows, and a series of fins or vanes, usually made of aluminum, which are in good thermal contact with the copper tube. The tube penetrates through aligned apertures in the fins or vanes. The heat flows to the vanes, and the vanes heat the room air that contacts them. The heated air moves by convection upwards into the room or comfort space. There is typically a baseboard cover positioned over the radiator or convector, with a damper to control air flow past the radiator.

Copper tubing is universally used as the hot water conduit through the radiator or convector. Copper is favored for a number of reasons, including good heat conduction to bring the heat to the fins or vanes, and because the copper material can be easily soldered or brazed to other tubing in the loop.

The use of copper tubing does have some disadvantages, however. One disadvantage is the expense involved, as copper is typically about three times as costly, pound for pound, as aluminum. Also, copper is relatively heavy, approximately three times the weight density of aluminum. If aluminum were used as the water conduit, then tubing the same size would have only one ninth the cost of copper tubing. Stated otherwise, for the same or lower cost, aluminum tubing of greater diameter can be used in substitution for copper tubing, without loss of thermal characteristics, and with other advantages, such as reduced velocity noise, elimination of thermal expansion noise, and reduced drop of pressure head in the loop.

Velocity noise is encountered in a baseboard radiator when the flow of water through the tubing is too great for the diameter of the tube, i.e., too small a tube diameter for the number of gallons per minute of flow needed. Typically, this problem would be addressed by increasing the size of the baseboard radiator, which increases the cost significantly, or by increasing the water temperature, which permits the user to have a lower flow rate, but also results in higher heating costs.

Thermal expansion noise commonly occurs with conventional copper/aluminum baseboard radiators, due to the difference in thermal expansion coefficient as between the copper tube and the aluminum vanes. This produces an annoying clicking or ticking noise, especially at the onset of a heating cycle when the radiator is heating up.

In view of the problems encountered with copper/aluminum baseboard heat radiators, it would seem that aluminum tubing would be an ideal substitute for the copper tubing in the baseboard radiator. However, there are issues that make aluminum tubing or aluminum pipe difficult to use in a hot water system.

Aluminum is difficult and expensive to weld to aluminum itself or to other metals, and cannot simply be soldered or brazed to copper, steel, or brass; so the connectivity of the aluminum/aluminum baseboard radiator to the rest of the system is a difficult hurdle to surmount. Also, to date no one has proposed an effective way to install aluminum vanes or fins onto an aluminum pipe or tube for a baseboard heat radiator.

Thus, the object of this invention is to find a way to overcome these difficulties, so that the advantages of an aluminum/aluminum baseboard heater or radiator can be enjoyed, namely, lower cost installation, reduced velocity noise, and avoidance of thermal expansion ticking noises, but without any loss of durability, ruggedness, or thermal efficiency. A related object is to find a way to terminate aluminum pipe or tubing so it can be connected into the flow loop.

OBJECTS AND SUMMARY OF THE INVENTION

Accordingly, it is an object of the present invention to provide an improvement to a baseboard type liquid-air heat exchanger that avoids the above-mentioned drawback(s) of the prior art.

It is another object to provide a tube and fin heat exchanger in which aluminum fins are installed onto an aluminum tube, and which has an insert (or inserts) effectively installed at its end (or ends) forming a hermetic seal with the aluminum tubing, and also allowing the tubing to be connected easily to other components of the hot water heating loop.

It is a particular object to provide a process or method of creating an aluminum/aluminum heater or radiator of this type.

It is another related object to provide a method of terminating an aluminum tube with an insert that is installed with a male portion of the insert penetrating the tube end portion, and with the aluminum material of the tube end portion being deformed radially inward, i.e, squeezed, with sufficient force to flow the aluminum material over gripping structure, e.g., threads, on the male portion of the insert.

Yet another object is to provide a fixture for holding the array of aluminum fins while the aluminum pipe or tube is pushed through aligned apertures in the fins, such that a rigid mechanical interference fit is created, and so that there is high thermal contact between the fins and the tube.

In accordance with one aspect of the present invention, an aluminum tube/aluminum fin baseboard heat exchanger, is manufactured from an array of fins, an aluminum tube, and one or more inserts made of a material other than aluminum.

The vane array is created from an elongated strip of sheet aluminum, formed into a series of rectangular fin portions and spacer portions. Each fin portion has a predetermined height H and width W and each being joined to the next by one of the spacer portions, which have a predetermined spacing distance S. Each fin portion has a central opening or aperture formed in it. The array is formed by bending this elongated strip into a serpentine fin array in which the fin portions are disposed generally parallel to one another and are spaced apart by spacing distance S, with the spacer portions joining successive ones of the fin portions and appearing alternately at the left side and the right side of said array. The center openings or apertures of the fin portions are aligned on a tube axis.

The serpentine fin assembly is positioned into an assembly fixture to hold the assembly while the tube is pushed through the aligned apertures. The fixture has spacer plates that are disposed to enter into the voids formed between successive fin portions, so that the action of pushing the pipe or tube through the array does not collapse the fin portions onto one another.

Then the aluminum tube is inserted through the aligned center apertures in the fin assembly such that the tube contacts and deforms the fin portions at the apertures to create an interference fit of the tube with each fin portion. This results with one end portion of the tube projecting from said fin assembly, and typically tube end portions project from both ends of the assembly.

Now, a connector nipple is simply slid into the (or each) end portion of the aluminum tube. The connector nipple has a male portion that fits into the end portion, and has an undulating gripping structure formed on its outer surface. This can take the form of male threads, but can be rings, knurling or other positive gripping structure that protrudes radially to mate with an inside surface at the end portion of the aluminum tube.

Then, a hydraulic jaw or collet is brought into contact with the end portion of the tube, and this compresses the aluminum tube with sufficient force to deform the end portion inward, and causes the aluminum material to flow onto the gripping structure on the male portion of the insert. This creates a hermetic seal between tube and connector nipple. The deforming operation includes sliding the jaw arrangement, while held closed, along the end of the aluminum tube. The connector nipple is formed of a metal that is harder than the aluminum of the aluminum tube, e.g., steel or brass. A sealing material, such as a pipe thread compound or even a ductile metal, can be applied onto the male portion of connector nipple before inserting same into the end portion of the aluminum tube.

The spacer portions in the serpentine fin array may each have upper and lower portions joining upper and lower edges of adjacent ones of the fin portions, so as to define or create a central void in the spacer portion. This will permit some air flow transversely.

According to another aspect if this invention, an aluminum liquid-air heat exchanger is created, of the type in which a fin assembly of a plurality of aluminum fins is supported on a central aluminum pipe or tube that penetrates through central apertures in said aluminum fins and is in mechanical and thermal contact therewith.

The fin assembly comprises a series of rectangular fin portions and spacer portions, each fin portion having a predetermined height H and width W and each being joined to the next by one of the one of the spacer portions having a predetermined spacing distance S. Each fin portion has a central aperture. The fin assembly is a serpentine array in which said fin portions are disposed generally parallel to one another and are spaced apart by the spacer portions, the spacer portions joining successive ones of the fin portions and appearing alternately at left and right sides of the array. The center apertures of the fin portions are aligned. The central aluminum tube protrudes from the ends of the fin assembly, and connector nipples are affixed at the end portions. The connector nipples each have a male portion fitting into the associated tube end and the male portion has a gripping structure protruding from an outer surface to mate with an inside surface of the associated tube end. The tube end portions are compressed and deformed radially inward such that the aluminum thereof engages the gripping structure.

The connector nipples can be threaded steel or brass nipples or similar unions or fittings, formed of a metal that is harder than the aluminum of the aluminum tube.

The spacer portions of the fin array may each have upper and lower portions joining upper and lower edges of adjacent ones of said fin portions, and defining a central void between the upper and lower portions.

In a hot water system, the tube is double ended, with a fitting, i.e., insert at each end. However, in some steam heat systems, only a single ended pipe is needed for a heat exchanger, and in that case only one end of the pipe will be provided with the fitting or insert, the other end being blank or closed.

The invention can be applied to aluminum tubing as well, apart from the tube being a component of a baseboard radiator. That is, the invention can be employed as a means of terminating an aluminum tube or conduit so that the aluminum tube may be joined to other components of a flow system.

According to an aspect of this invention, an aluminum tube is terminated by a connector insert of a metal other than aluminum. The end portion of the tube has a predetermined inside diameter, and the insert is in the form of a tubular nipple with a male portion of an outside diameter that does not exceed the inside diameter of the tube end portion. There is radially protruding gripping structure on the male portion.

The method is carried out by placing the insert into the tube end portion, with the male portion thereof penetrating into the tube end portion. A collet or similar compressing jaw member closes onto the end of the tube, exerting an amount of force, directed radially inward, that is sufficient to deform the tube end radially inward. This causes the aluminum material to flow into the gripping structure on the male portion of the insert. Then jaw member slides axially on the end portion, while being held closed, after which the jaw member is released. The insert is thus permanently held in the tube end, and can be used as a termination for attaching to other elements of a hot water loop or other flow system.

A sealing material can be applied onto the insert male portion, prior to insertion into the end of the tube. The sealing material can include a ductile metal, e.g., an alloy or tin or another soft metal, or can be a pipe-thread sealing compound. The insert may be a steel threaded nipple or a brass threaded nipple.

The above and many other objects, features, and advantages of this invention will be more fully appreciated from the ensuing description of certain preferred embodiments, which are to be read in conjunction with the accompanying Drawing.

DETAILED DESCRIPTION OF THE PREFERRED EMBODIMENT

Figure 1:
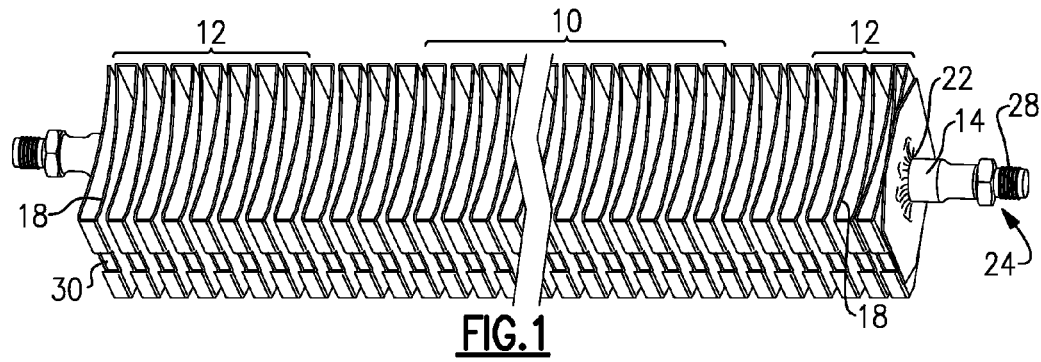
FIG. 1 is a perspective view of a baseboard radiator element according to one preferred embodiment of the present invention.

With reference now to the Drawing, FIG. 1 shows a baseboard radiator element 10 in the form of a fin assembly 12, i.e., a multiple of parallel vanes or fins, and a hot water tube 14 penetrating the fin assembly. In this case, the fin assembly 12 is formed of aluminum sheet, and the tube 14 is an aluminum tube. End portions 16 of the tube protrude from the left and right ends of the fin assembly. Here, the fin assembly has fins 18 or vanes that are generally rectangular, and parallel to one another, and spacer elements 20 that join to edges of successive ones of the fins, alternately on one side and the other (in FIG. 1, only the spacer elements 20 on the front are visible). Each fin 18 has a center aperture 22, and the tube 14 is pushed through the apertures of all the fins, as the apertures 22 are all aligned with one another. The aluminum material of the fins 18 adjacent the apertures 22 yields as the tube 14 is pushed through, so that the fin material bends and grips against the outside of the tube to make good mechanical and thermal contact.

At each end portion 16 there is a termination insert 24 in the form of a threaded nipple. This is formed of steel or brass, i.e., a metal other than aluminum and metal that is harder than the aluminum of the tube 14. There is a reduced diameter portion 26 of the tubing at the end portion 16, where the tubing is squeezed, i.e., crimped or pushed radially inward against a male portion of the insert that penetrates the end portion 16, as will be discussed below. There is a threaded exposed end 28 on each nipple or insert, which permits the radiator element to be connected to tubing in the hot water heating loop (not shown here). This can be done using standard threaded connectors. However, if a brass or steel plain-ended nipple is used as this insert 24, this could be connected by solder or braze to copper tubing in the loop. Generally rectangular cutouts or openings 30 in the spacer elements 20 are centrally located on each spacer element 20, and these serve to allow an amount of air flow through that side between adjacent vanes. The other three sides of the air space between vanes are open (See FIG. 4).

Figure 2:
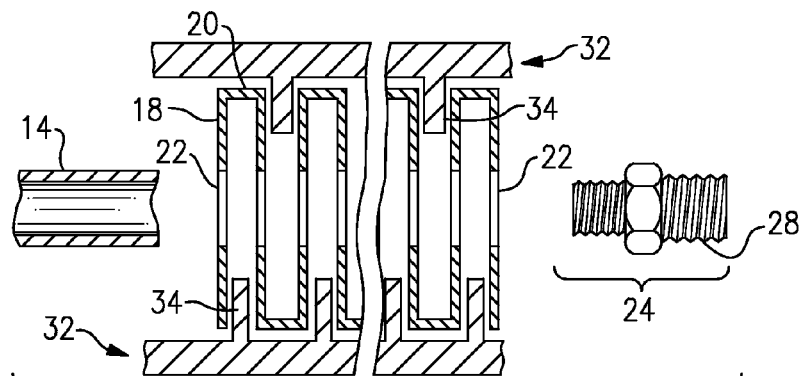
FIG. 2 is a schematic view of the aluminum tube, the aluminum fin assembly, an assembly fixture, and an insert or termination for the tube, according to one preferred embodiment of this invention.

In this embodiment, the fin assembly 12 is a serpentine arrangement of the parallel vanes or fins 18 and the spacer elements 20 appear alternately on the one side and the other. For assembly of the radiator element 10, the serpentine fin assembly 12 is placed into a fixture 32 (See FIG. 2), in which there are a series of separator plates 34. The separator plates fit into the spacings or voids between successive ones of the fins or vanes 18 on the side opposite the associated spacer element 20. These serve to support the vanes 18 against movement during tube insertion, and keep the fin assembly from collapsing under the force of the aluminum tube 14 being pushed through.

Figure 3:
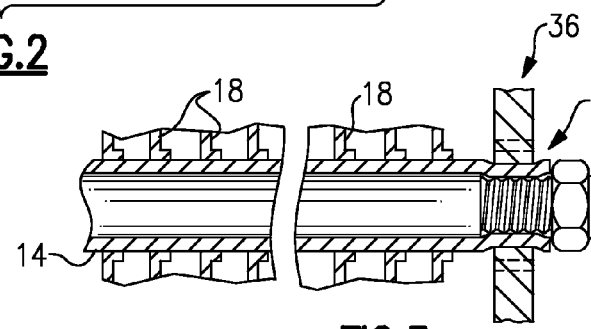
FIG. 3 is a sectional view of a portion of the baseboard radiator of this embodiment.

The action of pushing through the tube 14 serves to deflect the aluminum sheet at the edges of the apertures 22. This bends the material and forms a gripping structure to create a good mechanical and thermal contact between the fins and the tube. (See FIG. 3).

Figure 4:
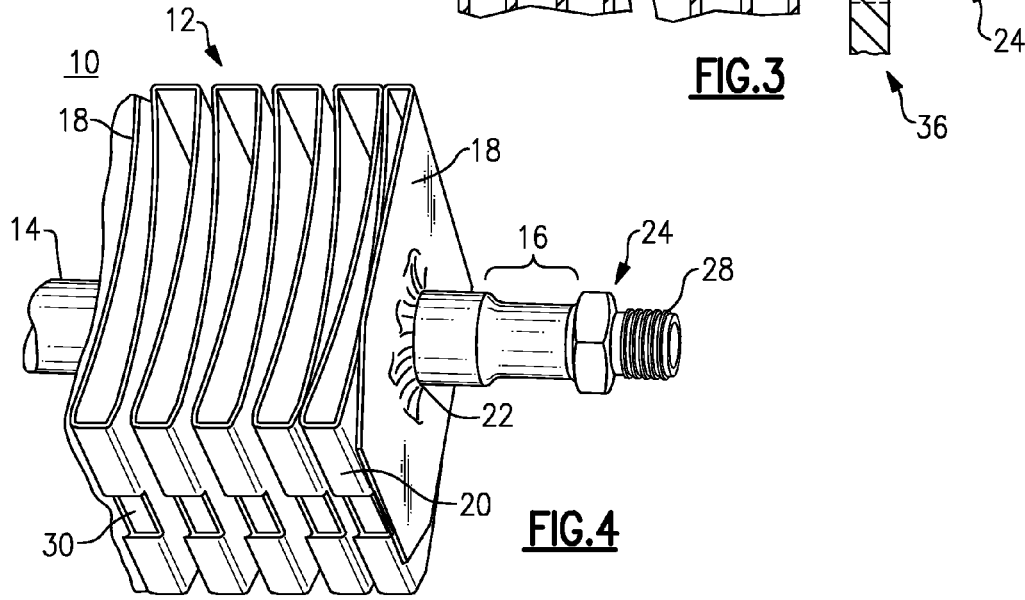
FIG. 4 is an enlarged perspective view of one end of the baseboard radiator of this embodiment.

After the tube 14 has been pushed through, and the end portion protrudes from the end of the fin assembly 12, then the tubular insert or termination 24 is pushed into the end of the tube, and is mechanically sealed in place. Here a jaw member or collet member 36 closes down against the outer surface of the tube at the end portion 16. Sufficient force is applied, e.g., by hydraulic means, so that the jaw member pushes the aluminum material radially inward causing the aluminum material (which is somewhat ductile) to flow onto gripping structure on the male portion of the insert 24 that is within the end portion 16. Then the jaw member 36 is pulled axially so that it slides along the end portion for a short distance. This creates the reduced diameter portion 26 as shown in FIG. 4. In a preferred embodiment, the male portion of the insert 24 is threaded, and this action causes the aluminum to flow into the grooves between threads, so the insert is held with a strong mechanical gripping force, and cannot be pulled or twisted out. This also creates a hermetic seal as between the tube and the insert, so that there is no leakage at the terminations of the baseboard radiator element. If desired, a material can be applied to the threads of the insert before it is placed into the end of the aluminum tube 14, e.g., a pipe thread compound, a Teflon or other polymer pipe thread compound, or a ductile metal.

While not shown here, the baseboard radiator would include a cover and frame for mounting on a base board, as well as air dampers and other conventional parts. The cover and/or frame may include hangers for a return pipe to pass beneath the radiator element 10. The return pipe can be metal, PVC, or other material.

Also, a single-ended version of the illustrated radiator could be used in a steam heating system.

Figure 5:
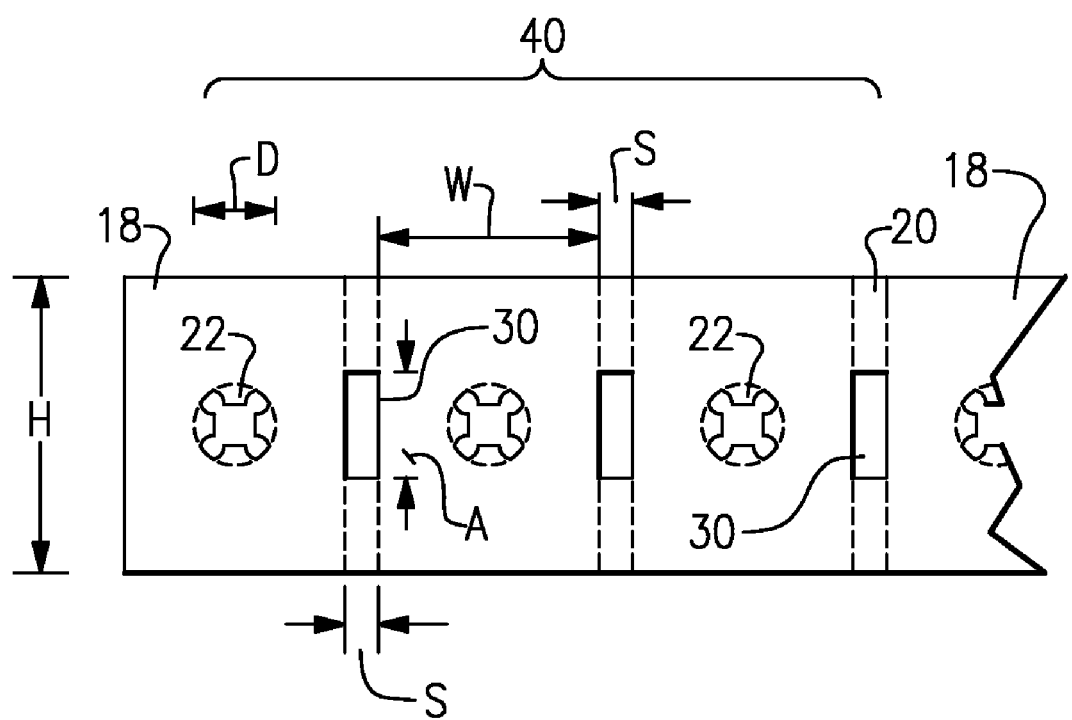
FIG. 5 is a plan view of a strip of aluminum sheet to be formed into the vane or fin assembly of this embodiment.

FIG. 5 illustrates the method of forming the aluminum fin assembly of this embodiment. An aluminum sheet 40 is formed as an elongated strip consisting of the rectangular vanes or fins 18, of height H and width W alternating with the spacer portion 20 of spacing distance S. In one possible embodiment, the fins can have a height H of about 4.625 inches, and a width W of about 4.0 inches, and the spacing distance S can be 0.375 inches. Of course, the dimensions of the fins, and the number of fins and length of the assembly, will vary depending on the amount of heat needed for a given space and depending on the water temperature and rate of flow. The center apertures 22 and rectangular cutouts 30 in the fins 18 and spacer portions 20 are also shown here.

The strip of aluminum sheet is bent along the fold lines (shown in broken line) for form the serpentine shaped fin assembly 12. In other embodiments, the fins and spacers do not have to have the same shape or dimension as illustrated for this embodiment.

Figure 6:
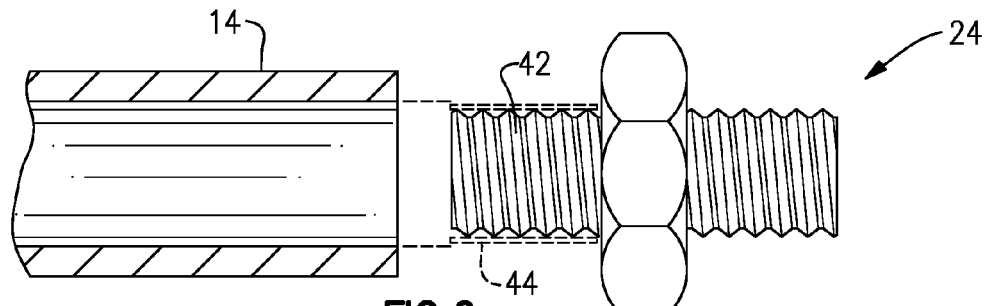
FIGS. 6, 7, 8, and 9 are sectional views of the end portion of the aluminum tube and the terminating insert, for illustrating the process of installing the insert.

The method of joining the insert 24 to the end of the aluminum tube 14 is shown in FIGS. 6, 7, 8, and 9. First, the insert 24 is slid into the open end of the tube 14 (FIG. 6). As shown here the insert has a male portion 42 that has a diameter that does not exceed the inner diameter of the tube 14 at its end. The male portion 42 here is shown as being threaded, and the male threads serve as gripping structure that protrude radially out from the male portion. In other inserts, the gripping structure can be rings, or even knurling, to allow the aluminum material to deform into the structure and lock into it mechanically.

An additional sealing material 14 is shown as being applied onto the threads of the male portion 42. This can be a relatively soft and malleable metal, e.g., containing tin and or zinc, or it may be a compound that is often used in plumbing for sealing threads of pipes.

Figure 7:
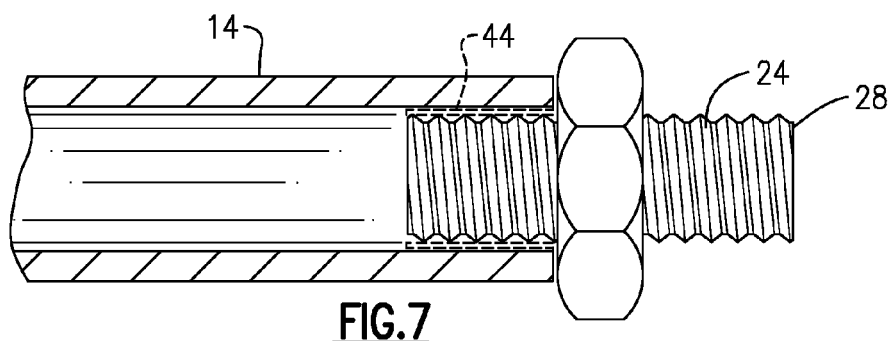

The insert 24 is slid into the pipe or tube 14, as shown in FIG. 7.

Figure 8:
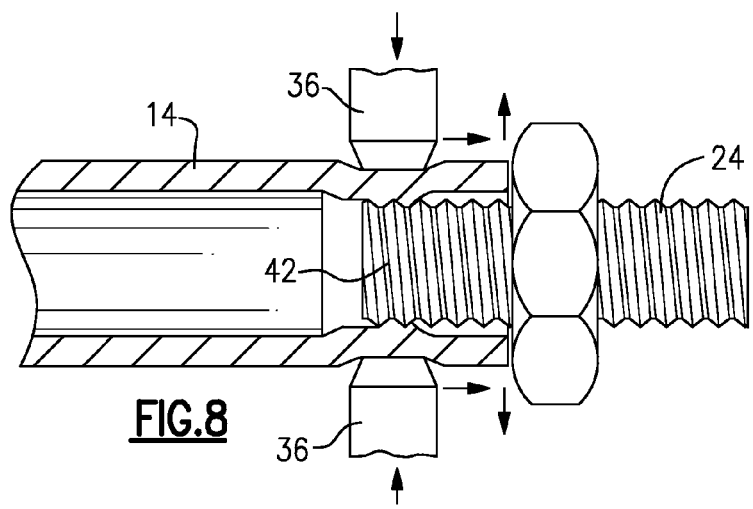
Figure 9:
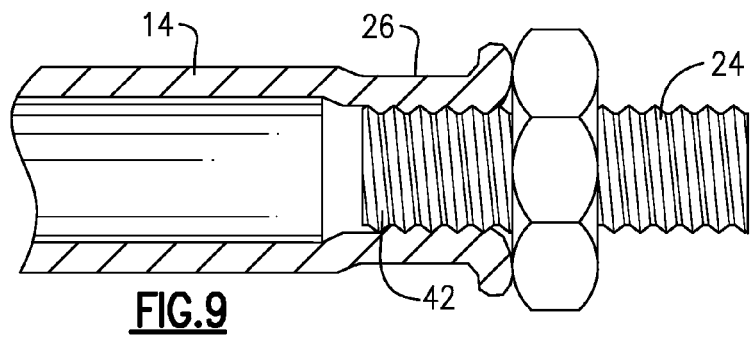

The jaw device or collet 36 closes down onto the tube 14, as shown in FIG. 8, and then is pulled axially, i.e., in the direction indicated by arrows, and then released outwards from the tube 14. This action creates the joint between aluminum tube 14 and insert 24 as shown in FIG. 9. The insert 24 may be straight, as shown, or may be bent or curved, e.g., in the form of an elbow.

Only two jaws of the jaw device or collet 36 are shown in this cross section, but it should be understood that the jaw device should have a sufficient number of jaw elements so that the squeezed or deformed portion 26 is made smooth and even.

The aluminum construction of the baseboard radiator element 10 achieves a reduction in cost without diminishing the performance characteristics. Moreover, the device can be installed easily using threaded couplings and connectors, which can reduce installation costs. This construction can be used for radiator elements employing other low-cost, thermally conductive pipes or tubes.

In addition, the combination of aluminum fins and aluminum tubes reduces or eliminates the annoyance of thermal expansion noises which cannot be avoided in copper/aluminum baseboard radiators of the prior art.

The procedure of installing inserts into the aluminum tubing as described above for the center tube of the radiator can be extended to installations of aluminum tubing elsewhere in the hot water loop, so that the expense of copper tube installation can be avoided.

While the invention has been described with reference to specific preferred embodiments, the invention is certainly not limited to the precise embodiments as illustrated here. Rather, many modifications and variations will become apparent to persons of skill in the art without departure from the scope and spirit of this invention, as defined in the appended claims.

I claim:

1. A method of forming an aluminum baseboard heat exchanger, comprising:
   (a) forming an elongated strip of sheet aluminum into a series of fin portions and spacer portions, each fin portion of said series of fin portions having a predetermined height H and width W and each of the said fin portions being joined to the next in said series by one of the a spacer portions having a predetermined spacing distance S and with each said fin portion having a central aperture formed therein;
   (b) bending said elongated strip into a serpentine fin array in which said fin portions are disposed generally parallel to one another and spaced apart by said spacer portions, said spacer portions joining successive ones of said fin portions and appearing alternately at a left side and a right side of said array, and such that the center apertures of said fin portions are aligned;
   (c) placing said serpentine fin assembly into an assembly fixture, the fixture having spacer members that are disposed to enter into voids formed between successive ones of said fin portions;
   (d) inserting a thermally conductive aluminum center tube through the aligned center apertures in said fin assembly such that the aluminum tube contacts and deforms the fin portions at said openings to create an interference fit of the tube with each of said fin portions; and resulting with one end of the tube projecting from said fin assembly;
   (e) affixing a connector nipple into said one end portion of the aluminum center tube, the connector nipple having a male portion fitting to said one end portion and having a gripping structure formed on an outer surface to mate with an inside surface of said one end portion of the aluminum center tube; and
   (f) deforming said one end portion of said aluminum center tube inward to flow the material thereof onto said gripping structure to create a hermetic seal between said tube and said connector nipple; wherein said step of deforming includes closing a jaw arrangement onto said one end of the center tube, the jaw arrangement comprising a plurality of jaw members applying a compressive force thereon around the circumference of the end portion of the tube, the compression force being of a sufficient level to compress the aluminum center tube radially inward against the male portion of said connector nipple, wherein there are a sufficient number of said jaw members so that the deformation of the one end of the aluminum center tube is made smooth and even over the circumference thereof, and wherein the step of deforming includes sliding the jaw arrangement, while held closed, along the one end portion of the center tube in a longitudinal direction of the tube.

2. The method according to claim 1 wherein said spacer portions each have upper and lower portions joining upper and lower edges of adjacent ones of said fin portions, and defining a central void between said upper and lower portions.

3. The method according to claim 1 wherein said connector nipple is formed of a metal that is harder than the aluminum of said center tube.

4. The method according to claim 3 comprising applying a sealing material onto the male portion of said connector nipple before inserting same into the end portion of the aluminum tube.

5. The method according to claim 1, wherein the sliding of said jaw members creates a generally cylindrical reduced-diameter portion of said one end of the aluminum center tube.

6. A method of terminating an aluminum tube with a connector insert of a metal other than aluminum, wherein said aluminum tube has an end that has a predetermined inside diameter, and wherein said insert is in the form of a tubular nipple having a male portion of an outside diameter that does not exceed said predetermined inside diameter, and in which there is radially protruding gripping structure on said male portion, the method comprising:
   (a) placing said insert into said end with the male portion thereof penetrating into said end of the aluminum tube;
   (b) closing a jaw member onto the end of the tube with an amount of force sufficient to deform the end of the tube radially inward onto the gripping structure on the male portion of said insert, said jaw member having a sufficient number of jaw elements so that the deformation at the end of the tube is made smooth and even over the circumference thereof;
   (c) sliding said jaw member, while closed, along the end of the aluminum tube in a longitudinal direction of the tube while being held closed with said amount of force such that the deformation creates an elongated joint of the aluminum tube onto the gripping structure on the male portion of said insert; and
   (d) releasing said jaw member.

7. The method according to claim 6, comprising applying a sealing material onto said male member prior to insertion into the end of said tube.

8. The method according to claim 7, wherein said sealing material includes a ductile metal.

9. The method according to claim 7, wherein said sealing material includes a pipe-thread sealing compound.

10. The method according to claim 6, wherein said insert includes a steel threaded nipple.

11. The method according to claim 6, wherein said insert includes a brass threaded nipple.

12. The method according to claim 6, wherein the sliding of said jaw member creates a generally cylindrical reduced-diameter portion at said end of the aluminum tube.

* * * * *